United States Patent [19]

Haubs et al.

[11] Patent Number: 5,688,908
[45] Date of Patent: Nov. 18, 1997

[54] PROCESS FOR THE PREPARATION OF AROMATIC SULFUR-CONTAINING POLYMERS

[75] Inventors: Michael Haubs, Bad Kreuznach; Andreas Schleicher, Beselich; Thorsten Niklas, Marburg, all of Germany

[73] Assignee: Hoechst Aktiengesellschaft, Germany

[21] Appl. No.: 631,782

[22] Filed: Apr. 12, 1996

[30] Foreign Application Priority Data

Apr. 13, 1995 [DE] Germany ............... 195 13 479.6

[51] Int. Cl.$^6$ .................................................. C08G 75/14
[52] U.S. Cl. .................................. 528/388; 525/537
[58] Field of Search ............................ 528/388; 525/537

[56] References Cited

U.S. PATENT DOCUMENTS

| | | | |
|---|---|---|---|
| 4,645,826 | 2/1987 | Iizuka et al. | 528/388 |
| 4,794,164 | 12/1988 | Iwasaki et al. | 528/388 |
| 4,812,539 | 3/1989 | Iizuka et al. | 528/388 |
| 4,910,294 | 3/1990 | Ogata et al. | 528/388 |
| 5,130,411 | 7/1992 | Tanaka et al. | 528/388 |
| 5,179,194 | 1/1993 | Kawakami et al. | 528/388 |
| 5,384,391 | 1/1995 | Miyata et al. | 528/388 |

FOREIGN PATENT DOCUMENTS

| | | |
|---|---|---|
| 0256757 | 2/1988 | European Pat. Off. . |
| 0259984 | 3/1988 | European Pat. Off. . |
| 0527055 | 2/1993 | European Pat. Off. . |

*Primary Examiner*—Mark D. Sweet
*Attorney, Agent, or Firm*—Connolly and Hutz

[57] ABSTRACT

In the process for the preparation of aromatic sulfur-containing polymers, the polymer is formed from a prepolymer having halogen end groups. The process can be carried out in two stages: 1. Preparation of the prepolymer and 2. conversion of the prepolymer into the polymer. The process is particularly suitable for the preparation of polyphenylene sulfide.

20 Claims, No Drawings

PROCESS FOR THE PREPARATION OF AROMATIC SULFUR-CONTAINING POLYMERS

The invention relates to a process for the preparation of linear or branched aromatic sulfur-containing polymers, such as polyarylene sulfides, in particular polyphenylene sulfide (PPS).

Aromatic sulfur-containing polymers, in particular polyarylene sulfides and polyphenylene sulfide (PPS), are distinguished by an exceptional heat stability and outstanding resistance to chemicals and are therefore of great interest for industrial uses.

The preparation of PPS is described, for example, in U.S. Pat. No. 4,910,294 and according to this is carried out from phenylene dihalides, in particular dichlorobenzene (DCB), and sodium sulfide in a high-boiling dipolar aprotic solvent, such as methylpyrrolidone (NMP). The reaction temperatures are 220° C. to 270° C. and the reaction times are 5–12 hours. However, it is not easily possible for molecular weights which are sufficiently high for industrial uses to be achieved. As a remedy, the polymers are subjected to a "roasting process", or trifunctional comonomers, such as trichlorobenzene, are added to the reaction batch. However, the polymers are then branched, which often causes disadvantages for the use, because, for example, toughness is reduced. Another possibility of achieving high molecular weights comprises addition of water in a second reaction stage and heating of the reaction mixture to 260° C. This can also be carried out in a two-stage process (EP 0256757, EP 0259984, U.S. Pat. No. 4,794,164), but in this case large amounts of water must be added (6 to 15 mol of water per kg of solvent), so that a two-phase system forms. However, these processes have the disadvantage that long reaction times are necessary, the solvent partly decomposes (formation of methylamine), and moreover further undesired by-products are formed.

Isolation and purification of the polymers has likewise been achieved only unsatisfactorily, since the salt also obtained in large quantities is partly incorporated by the polymer and can be removed only by extensive washing operations. To remove volatile impurities, which cause major trouble during melt extrusion, either the product must be washed with large quantities of organic solvent, which is expensive, or the isolated polymer must be "roasted" at elevated temperature, which is very detrimental to the purity of the polymer. In all cases, the removal of the volatile impurities is quite incomplete. This also manifests itself in the fact that undesirable components are released to the environment during melt extrusion, specifically during fiber spinning.

EP-A-0527055 describes the preparation of high molecular weight PPS by ring-opening polymerization of cyclic PPS oligomers. However, it is difficult to prepare relatively large quantities of PPS in this way, since cyclic oligomers cannot easily be prepared in good yield.

The stability of the melt viscosity (melt stability) of the polymers is also not very satisfactory according to the prior art, so that various amounts of stabilizers are added.

Finally, large amounts of solvents must be recovered and purified by distillation, which renders working up of the polymers very expensive. Overall, the preparation of high molecular weight pure PPS according to the prior art is time-consuming, the isolation and purification of the polymer is complex and expensive and the quality of the polymer is in need of improvement.

The object therefore was to prepare aromatic sulfur-containing polymers, in particular polyarylene sulfides, in a broad molecular weight range (for example $M_n$ 5000 to 100000 g/mol) in good purity with short reaction times, the intention also being that the expenditure for isolation of the polymer and recovery of the solvent remains low.

This object is achieved by preparing oligomers or polymers which contain arylene sulfide units and are terminated by halogen, and converting these products, the so-called prepolymer, into a sulfur-containing polymer having a higher molecular weight than the prepolymer by reaction with a sulfur compound.

The invention thus relates to a process for the preparation of aromatic sulfur-containing polymers which comprises forming the polymer from a prepolymer having halogen end groups.

In the process, a prepolymer having halogen end groups is advantageously prepared and isolated in a first stage, and the prepolymer is converted into a polymer of higher molecular weight by reaction with a sulfur compound in a second stage.

Sulfur-containing polymers are polymers which contain arylene sulfide units. The arylene constituents of the arylene sulfide units contain mono- or polynuclear aromatics or linked aromatics. The aromatics can also contain hetero atoms. Such aromatics, which can be substituted or unsubstituted, are, for example, benzene, pyridine, biphenyl, naphthalene and phenanthrene. Substituents are, for example, $C_1$–$C_6$-alkyl, $C_1$–$C_6$-alkoxy, carboxyl, amino and sulfonic acid groups. Linked aromatics are, for example, biphenyl or aromatics linked by ether bridges (arylene ethers).

Preferred sulfur-containing polymers are polyarylene sulfides, in particular polyphenylene sulfide.

The term prepolymer embraces oligomers or polymers which contain arylene sulfide units and are terminated by halogen. These products usually have a molecular weight, expressed as the number-average molecular weight $M_n$, in the range from 500 to 20000 g/mol. They can be prepared by reaction of a sulfur compound, in particular inorganic sulfides, with an excess of halogenated aromatic hydrocarbons, for example by reaction of sodium sulfide with a 5 to 50% molar excess of p-dichlorobenzene in NMP as the solvent. They can be linear or branched. It is also possible to prepare substituted prepolymers by employing substituted dihaloaryl compounds (for example 2,5-dichlorotoluene). The prepolymers have a halogen content of organically bonded halogen in the range from 0.2 to 10 percent by weight; the halogen content is typically 0.5 to 5 percent by weight, depending on the molecular weight. The presence of oligomers or polymers terminated by halogen is demonstrated experimentally by the number-average molecular weight and the halogen content, and by their $^1$H-NMR spectra. Suitable halogen end groups are the halogens fluorine, chlorine, bromine and iodine, preferably chlorine and bromine, particularly preferably chlorine.

Suitable sulfur compounds for the preparation of the prepolymer and of the polymer are organic and inorganic sulfides. Inorganic sulfides are sulfides of the alkali metals and alkaline earth metals, such as lithium sulfide, potassium sulfide, calcium sulfide and, preferably, sodium sulfide. An organic sulfide is, for example, the addition product of hydrogen sulfide and 1,8-diazabicyclo[5.4.0]undec-7-ene (DBU). It is formed from DBU and $H_2S$ in the molar ratio of 2:1. The salts can be added as such or produced in situ, and thus, for example, the sodium sulfide preferably employed is formed from sodium hydrogen sulfide and sodium hydroxide. The sulfides can also be employed with water of crystallization. It has been found that about 1 mol of water per mole of sulfide is advantageous for the first stage.

Suitable halogenated aromatic hydrocarbons are arylene dihalides, inter alia dihalobenzenes, such as o-, m- and p-dichlorobenzene, and substituted dihalobenzenes, such as 2,5-dichlorotoluene, 3,5-dichlorobenzoic acid, 2,5-dichlorobenzenesulfonic acid or 3,5-dichlorobenzenesulfonic acid, or salts thereof. However, dihalonaphthalenes, such as 1,4-dibromonaphthalene, or dihalodiphenyl ethers, such as 4,4'-dichlorodiphenyl ether, can also be employed. It is likewise possible to employ mixtures of different arylene dihalides. It is also possible to employ small amounts (0.2 to 5 mol percent, based on the arylene dihalide) of polyhalogenated aromatic hydrocarbons in order to obtain branched or crosslinked sulfur-containing polymers.

Suitable solvents for the preparation of the prepolymer and of the polymer in the second stage are dipolar aprotic solvents of the amide type, such as dimethylformamide, (DMF), dimethylacetamide (DMAc), N-methylcaprolactam or N-alkylated pyrrolidones, or mixtures thereof. NMP is particularly preferred. The prepolymer is dissolved under the reaction conditions of the first and second process stage.

The process according to the invention is described below by the example of the preparation of polyphenylene sulfide (PPS), but without being limited to this.

To prepare the prepolymer, sodium sulfide is reacted with excess p-dichlorobenzene in NMP to the extent of about 80 to 95%. In addition to the prepolymer, the reaction mixture then comprises undissolved sodium chloride, unreacted monomers and the solvent NMP. The prepolymer formed is separated off from the reaction mixture. The prepolymer is then in the second stage dissolved in NMP under the influence of heat and under pressure and subjected to a condensation reaction with a little sodium sulfide to give the polymer. On cooling, the polymer is obtained as crystals and can easily be isolated by filtration.

The reaction conditions for the first stage can be varied within wide limits. Thus, the reaction temperatures can be between 180° C. and 270° C., and 220° to 250° C. are preferred. The reaction times can be 20 minutes to 20 hours. 1 to 3 hours are preferred. Temperature programs can also advantageously be used, for example 30 minutes at 225° C. and then 1 hour at 245° C.

Working up of the reaction mixture of the first stage can be carried out in various ways:

The prepolymer can be separated off by cooling of the reaction mixture to temperatures below 200° C. and simple pressure filtration. The filter cake comprises the prepolymer and sodium chloride. The sodium chloride can be removed by washing with water.

It is also possible to work up the reaction mixture by flash evaporation or spray drying. During this process, the NMP and p-dichlorobenzene are removed. The PPS and sodium chloride are obtained as a largely dry mixture of solids, from which the sodium chloride can be washed out.

Filtration of the hot reaction mixture at 220° to 240° C. under pressure is also advantageous, the sodium chloride being removed as the residue on the filter. The filtrate comprises the dissolved prepolymer. On cooling of the filtrate below 200° C., the prepolymer crystallizes out and can easily be separated off by simple filtration (for example vacuum filtration). The solvent filtered off can be re-used for preparation of the prepolymer.

To prepare the polymer, the prepolymer is dissolved in NMP under pressure at temperatures of 230° C. and reacted with sodium sulfide in homogeneous solution. The concentration of the prepolymer here is expediently as high as possible. It can be between 15 and 90 percent by weight, preferably between 20 and 60 percent by weight, particularly preferably between 30 and 50 percent by weight. The amount of sodium sulfide added determines the molecular weight of the polymers. If the molecular weight is plotted as a function of the sodium sulfide/prepolymer weight ratio, a pronounced maximum results at a sodium sulfide/prepolymer ratio which obeys the following equation:

$$m(Na_2S)=m(PP) \times P_{Cl}$$

The symbols here have the following meanings:
m($Na_2S$): weight of the sodium sulfide (anhydrous) added
m(PP): weight of the prepolymer employed
$P_{Cl}$: weight content of organically bonded chlorine in the prepolymer, that is to say the bonded chlorine/prepolymer weight ratio (for example: 2 percent by weight=0.02)

The reaction temperatures in the second stage are 220° to 260° C., preferably 230° to 255° C., and the reaction times are 30 minutes to 5 hours, preferably 1 to 3 hours. At the end of the reaction, the polymer is present in the form of an almost clear, viscous solution, from which it crystallizes out during cooling. The PPS which has crystallized out can easily be isolated by simple filtration. It can be freed from residues of mother liquor by washing with a little NMP. After washing with hot water, the polymer is dried.

The melting points of the polyphenylene sulfides are between 270° C. and 305° C., and 280° to 295° C. are typical. The melt viscosity is in the range from 5000 to 500000 mPas (centiPoise), preferably 50000 to 250000 mPas (centiPoise). The melt viscosity is stable without additives: at 300° C., it changes by less than 10% over a period of 1 hour.

The aromatic sulfur-containing polymers prepared according to the invention can be processed to shaped articles by melt extrusion. However, films and fibers having good mechanical properties can also be produced.

The novel process has a number of advantages:

The salt unavoidably obtained in large quantities during the synthesis can be removed very easily from the crystalline prepolymers without inclusions occurring. This removal is therefore rapid and effective in the novel process. Since they are crystalline, the prepolymers can likewise be purified very easily, and the polymer prepared from them is thus very pure and contains practically no volatile impurities.

The polymer also has a very high recrystallization temperature (from the melt), and is intrinsically stable in the melt without any additives.

The mother liquor of the first stage can furthermore be re-used directly for preparation of the prepolymer without purification steps (for example distillation), which is a considerable time and cost advantage.

Furthermore, the loss of solvent by decomposition is less than in conventional processes which operate with water in the reaction medium at high temperatures, which promotes degradation of the solvent and also further contaminates the polymer. In the novel process, no water is added, the reaction temperatures are lower and the reaction times are shorter.

Finally, the novel process does not result in any so-called "fines" (mixture of low molecular weight, in some cases cyclic, finely powdered oligomers) which are formed as a by-product and must be removed and disposed of.

Summarizing, the novel process affords a product of higher quality with lower cost expenditure.

The following examples are intended to illustrate the invention:

EXAMPLE 1

Preparation of the prepolymer PP1

A mixture of 300 ml of NMP, 79.2 g of $Na_2S\times 3\ H_2O$, 132.3 g of p-dichlorobenzene (DCB) and 49.2 g of sodium acetate is heated in a 2 liter titanium autoclave, while stirring, first at 220° C. for 30 minutes and then at 245° C. for 30 minutes. The cooled contents of the reactor are then poured onto 2.5 l of water, to which 15 ml of concentrated hydrochloric acid have been added beforehand. The precipitate which has separated out is filtered off with suction and washed with 2 l of water and then with 700 ml of acetone. It is then extracted with tetrahydrofuran (THF) overnight. The yield of oligomers predominantly terminated by chlorine is 55%. The chlorine content (organically bonded chlorine) of the sample was 3.8 percent by weight. This corresponds to a molecular weight $M_n$ of 1870 g/mol.

EXAMPLE 2

Preparation of prepolymer PP2

A mixture of 100 ml of NMP, 26.4 g of $Na_2S\times 3\ H_2O$ and 3 ml of water is heated slowly to 200° C. in a 250 ml glass autoclave, 13.5 ml of condensate distilling off. 39.4 g of p-dichlorobenzene are added to the mixture, which has been cooled to 180° C. The mixture is heated at 230° C. for 30 minutes and then at 245° C. for 1 hour. The cooled contents of the reactor are filtered off with suction over a suction filter with substantial exclusion of air and washed with 20 ml of NMP. The mother liquor is stored with exclusion of air (inert gas; cf. Example 3). The precipitate is boiled briefly in water, filtered off with suction and dried. Yield 18.8 g (87%).

EXAMPLE 3

Re-use of the mother liquor for preparation of the prepolymer 100 ml of the mother liquor from Example 2 are heated slowly to 203° C. with 26.4 g of $Na_2S\times 3\ H_2O$ in a 250 ml titanium autoclave, 13 ml of water and 2 g of DCB distilling off. Thereafter, 31.4 g of DCB are added at 180° C. and the contents of the reactor are heated, while stirring, at 230° C. for 30 minutes and then at 247° C. for 1 hour. After cooling, the contents of the reactor are filtered off with suction and the residue is washed with NMP and boiled briefly in water. The white precipitate is filtered off with suction and dried. Yield 19.7 g (91%).

EXAMPLE 4

Preparation of high molecular weight PPS 31.2 g of prepolymer PP1 from Example 1 are suspended in 60 ml of NMP in a 250 ml glass autoclave, while stirring, and 2.0 g of $Na_2S\times 3\ H_2O$, 1.15 g of sodium acetate and 0.5 ml of $H_2O$ are added with exclusion of air. The mixture is then heated at 245° C. for 2 hours, while stirring. The largely homogeneous, viscous solution is cooled and diluted with 40 ml of NMP. The crystalline precipitate is filtered off with suction, washed with NMP and boiled briefly in water. After filtration with suction, the polymer is dried. Yield: 95%.

The PPS has a melt viscosity of 177000 mPas at 300° C. and a shear rate of 10 $min^{-1}$. After one hour at 300° C., it is 172000 mPas. The melting point during the first heating up is 293° C., the recrystallization temperature on cooling from the melt is 246° C. and the melting point during the second heating up is 285° C.

EXAMPLE 5

Characterization of the prepolymers terminated by chlorine 2.5 g of the prepolymer are suspended in 50 ml of 85% strength by weight $HNO_3$ at T=−20° C. The suspension is allowed to warm slowly to T=0° C., while stirring, and the reaction is continued at this temperature for a further ½ hour. During this reaction time, the polyphenylene sulfoxide (PPSO) formed dissolves in the acid. After a total of 1 hour, the solution is introduced into 1 l of ice-water and the PPSO which has precipitated out is filtered off and washed until the pH of the wash water is neutral.

To determine the degree of polymerization, the dried product is dissolved in deuterated $HNO_3$ and a proton-NMR spectrum is then recorded immediately. A broad singlet signal is obtained at δ=7.4 ppm, which is assigned to the protons of the phenylene rings substituted by two sulfoxide groups in the para-positions. For each prepolymer molecule, this signal belongs to 4(n−1) protons (n=degree of polymerization). Two doublets at δ=7.15 ppm and δ=7.05 ppm are furthermore also observed, and are assigned to the terminal phenylene rings. This signal is caused by in each case 8 protons per prepolymer chain.

The average degree of polymerization of the prepolymers is determined by comparison of the integrated signal intensities of the singlet at δ=7.4 ppm with the intensities of the doublets δ=7.15 ppm and δ=7.05 ppm. It can be calculated in accordance with the following formula:

$$P_n = 1 + 2\times Is/Id$$

The symbols in this formula have the following meanings:

$P_n$: number-average of the degree of polymerization of the prepolymer

Is: relative intensity of the singlet peak at 7.4 ppm

Id: relative intensity of the sum of the two doublet peaks at 7.15 and 7.05 ppm.

$P_n$ can also be determined independently from the content of organically bonded chlorine, determined by elemental analysis, in accordance with the following formula:

$$P_n = (71/Pcl - 147)/108$$

The symbols in this formula have the following meanings:

$P_n$: number-average of the degree of polymerization

Pcl: weight content of organically bonded chlorine in the prepolymer

Quantitative evaluation of the NMR spectra shows that the end groups are chlorine end groups to the extent of more than 90 percent. Elemental analysis confirms that the signals assigned actually originate from chlorine end groups.

EXAMPLE 6

900 ml of NMP, 30 ml of water and 256 g of $Na_2S.2.8\ H_2O$ are initially introduced into a 2 l titanium autoclave under a nitrogen atmosphere and are heated to T=190° C., while stirring. 100 ml of condensate are distilled off at this temperature. 390 g of p-dichlorobenzene (2.65 mol) are added to the mixture, which has been cooled to T=180° C. The reactor is heated at T=230° C. for 2 hours. It is then heated up to T=240° C. and 100 ml of distillate are removed by cautious decompression via a valve.

The reaction mixture is cooled to T=130° C. and then filtered in a pressure suction filter thermostatically controlled at this temperature. The filter cake is washed first with acetone and then, to remove the NaCl, three times with hot water and subsequently dried. 164 g of the prepolymer are obtained, corresponding to a yield of 76%.

The PPS prepolymer is oxidized to PPSO and characterized by NMR spectroscopy in accordance with the method described in Example 5. The degree of polymerization determined is $P_n$=49. The content of organically bonded chlorine is 1.35%. A degree of polymerization of 47 is calculated from this.

A precipitate forms in the filtrate of the hot pressure filtration after cooling. This is separated off by filtration and worked up in the same way as the filter cake of the first hot filtration. A PPS oligomer having a degree of oligomerization determined by the NMR method already described of $P_n$=12 is obtained. The content of organically bonded chlorine is analyzed as 5.15%, corresponding to a degree of oligomerization of $P_n$=11.

We claim:

1. A process for producing an aromatic sulfur containing polymer which comprises in a first stage, producing a prepolymer containing halogenated end groups in the presence of a solvent from A) a halogenated aromatic hydrocarbon compound and B) a sulfide, wherein component A) is present in excess; separating the prepolymer from the reaction mixture; and, in a second stage, dissolving the prepolymer in a solvent; adding a small amount of component B) to the resulting solution; polymerizing the mixture thus formed in an homogenous state to obtain an aromatic sulfur containing polymer; and recovering the polymer.

2. A process for producing an aromatic sulfur containing polymer which comprises in a first stage producing a prepolymer containing halogenated end groups in the presence of a solvent from A) a dihalo-aromatic compound and B) a sulfide of an alkali- or alkali earth metal or hydrates thereof, wherein component A) is present in a 5 to 50% molar excess; separating the prepolymer from the reaction mixture; and, in a second stage, dissolving the prepolymer in a solvent; adding a small amount of component B) to the solution; polymerizing the mixture thus formed in an homogenous state to obtain an aromatic sulfur containing polymer; and recovering the polymer.

3. The process according to claim 2, wherein the aromatic sulfur containing polymer contains arylene sulfide units.

4. The process according to claim 3, wherein the polymer is a polyarylene sulfide.

5. The process according to claim 3, wherein the polymer is polyphenylene sulfide.

6. The process according to claim 2, wherein the prepolymer has content of organically bonded halogen of from 0.2 to 10% by weight.

7. The process according to claim 2, wherein the molecular weight $M_n$ of the prepolymer is from 500 to 20,000 g/mol.

8. The process according to claim 2, wherein component A) is dichlorobenzene or dichlorobenzene sulfonic acid and component B) is sodium sulfide.

9. The process according to claim 2, wherein the solvent is a dipolar aprotic compound of the amide type.

10. The process according to claim 9, wherein the solvent is N-methylpyrrolidone.

11. The process according to claim 2, wherein an excess of component A) to component B) substantially greater than 1.1 is used for the preparation of the prepolymer.

12. The process according to claim 2, wherein in the first stage the reaction temperature is from 180° to 270° C. and the reaction time is from 20 minutes to 20 hours and, in the second stage, the reaction temperature is from 220° to 260° C. and the reaction time is from 30 minutes to 5 hours.

13. The process according to claim 12, wherein in the first stage the temperature is from 220° to 250° C. and the time is from 1 to 3 hours and, in the second stage, the temperature is from 230° to 255° C. and the time is from 1 to 3 hours.

14. The process according to claim 2, wherein the prepolymer is present in the second stage in a concentration of from 15 to 90% by weight.

15. The process according to claim 14, wherein the concentration is from 20 to 60% by weight.

16. The process according to claim 2, wherein the addition of component B) in the second stage is calculated by the equation $$m(NA_2S) = m(PP) \times (P)_{cl}$$

wherein m($NA_2S$) is the weight of anhydrous component B) added, m(PP) is the weight of prepolymer employed and $P_{cl}$ is the weight content of organically bonded chlorine in the prepolymer.

17. An aromatic sulfur containing polymer produced by the process as claimed in claim 2.

18. The polymer as claimed in claim 17, wherein the polymer has a melt viscosity of from 5000 to 50,000 MPas and a molecular weight $M_n$ of from 5000 to 100,000 g/mol.

19. Shaped articles, films and fibers produced from an aromatic sulfur containing polymer produced by the process of claim 2.

20. A process for producing an aromatic sulfur containing polymer which comprises dissolving a halogen terminated prepolymer in a solvent; adding a small amount of a sulfide to the solution; polymerizing the mixture thus formed in an homogenous state to obtain the aromatic sulfur containing polymer; and recovering the polymer.

* * * * *